United States Patent [19]

Cowgur

[11] Patent Number: 4,936,349
[45] Date of Patent: Jun. 26, 1990

[54] CHEMICAL CONTAINER

[76] Inventor: Bruce E. Cowgur, 14 Katie La., Rochester, Ill. 62563

[21] Appl. No.: 435,342

[22] Filed: Nov. 13, 1989

[51] Int. Cl.$^5$ .............................................. B60P 3/30
[52] U.S. Cl. ................................... 137/899; 137/590; 224/42.45 R; 224/42.38
[58] Field of Search .............................. 137/899, 590; 224/42.03 A, 42.38, 42.42, 42.45 R

[56] References Cited

U.S. PATENT DOCUMENTS

| | | | |
|---|---|---|---|
| 1,423,158 | 7/1922 | Sewell | 224/42.38 |
| 1,807,736 | 6/1931 | Gird | 137/899 X |
| 2,013,370 | 9/1935 | Tygart | 137/899 X |
| 3,168,905 | 2/1965 | Wiltshire | 137/590 |
| 3,188,034 | 6/1965 | Jackson | 224/42.45 R X |
| 3,871,399 | 3/1975 | Watson | 137/899 |
| 3,981,323 | 9/1976 | Watson | 137/899 |
| 4,728,017 | 3/1988 | Mullican | 224/42.42 |

FOREIGN PATENT DOCUMENTS

| | | | |
|---|---|---|---|
| 516534 | 4/1921 | France | 224/42.38 |
| 1111047 | 2/1956 | France | 137/590 |
| 1423466 | 9/1988 | U.S.S.R. | 137/590 |

Primary Examiner—John Rivell
Attorney, Agent, or Firm—Zarley, McKee, Thomte, Voorhees & Sease

[57] ABSTRACT

The chemical tank of the present invention comprises a plastic container having a plurality of walls including a top wall, side walls, and an inclined bottom wall. The lower end of the inclined bottom wall includes a low point for receiving the last portions of the chemical. A suction tube is mounted within the container and extends downwardly where its lower end is adjacent the low point of the container. A heel bracket is used to mount the container to a spray wagon in such a manner that the container is oriented so the chemical will drain downwardly to the lower point of the container. The container can be quickly and easily attached and detached from the spray wagon.

10 Claims, 1 Drawing Sheet

U.S. Patent
Jun. 26, 1990
4,936,349
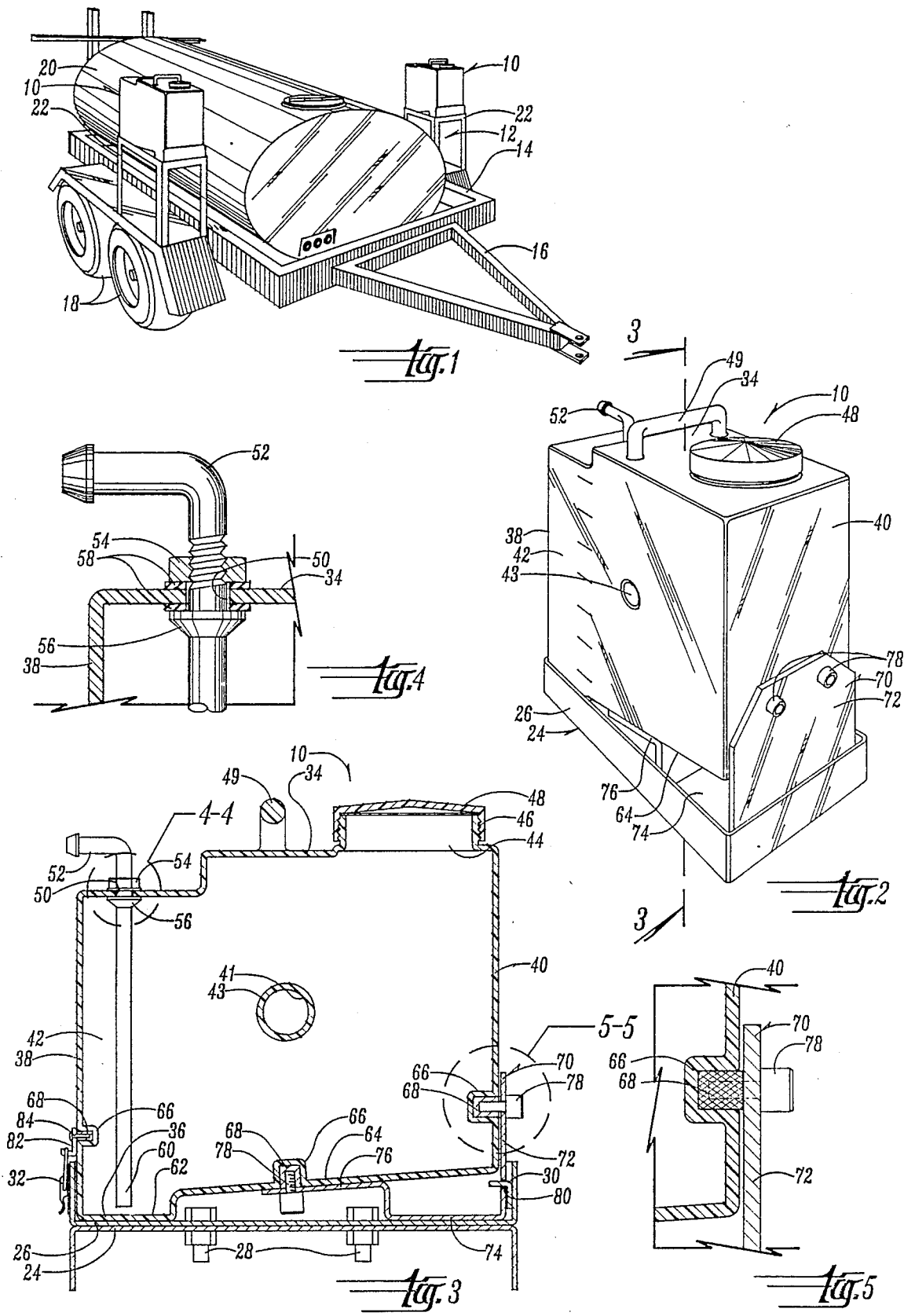

4,936,349

CHEMICAL CONTAINER

BACKGROUND OF THE INVENTION

This invention relates to a chemical container conventionally used for chemical spraying units.

Chemical containers of various types have been used for containing chemical sprays used in agriculture and in other applications. The concentrated chemical is contained in the container, and is draw out of the container by virtue of a tube which leads to an apparatus for mixing water with a concentrated chemical prior to spraying.

Certain problems have been encountered with chemical containers. One problem deals with the ability of the container to be completely or nearly completely emptied during the spraying process. Another problem encountered is the ability to remove the container from the spraying apparatus so that it can be refilled at a location remote from the spraying apparatus. The ability to quickly detach and remove the container so that it can be refilled is a desirable feature of any device of this type.

Therefore, a primary object of the present invention is the provision of an improved chemical container.

A further object of the present invention is the provision of a chemical container which can quickly and easily be removed from spraying apparatus so that it can be refilled at a point remote from the spraying apparatus.

A further object of the present invention is the provision of an improved chemical container which is shaped in such a manner to permit the container to be substantially emptied automatically by means of a suction tube.

A further object of the present invention is the provision of an improved chemical container which maintains a smooth continuous inner wall so that chemicals cannot escape.

A further object of the present invention is the provision of a chemical container having bolt receptacles therein which do not protrude through or penetrate the container wall.

A further object of the present invention is the provision of an improved chemical container which is economical to use, durable in operation, and economical to manufacture.

SUMMARY OF THE INVENTION

The present invention utilizes a chemical container having an inclined bottom wall which at its lower end includes a low point for receiving the last portions of the chemical contained within the container. A suction tube protrudes downwardly within the container and has its lower end immediately adjacent the low point of the container.

The lower wall of the container inclines upwardly from the low point, and the container is held in its normal position by a heel bracket. The heel bracket is bolted to the container by bolts protruding within receptacles which are embedded within the walls of the container. The receptacles do not protrude through the container walls, and therefore, the interior surface of the container walls remains continuous and unbroken so as to prevent leakage of chemicals.

BRIEF DESCRIPTION OF THE DRAWINGS

FIG. 1 is a perspective view of a typical spray wagon having the containers of the present invention detachably mounted thereon.

FIG. 2 is a perspective view of one of the containers of the present invention.

FIG. 3 is a sectional view taken along line 3—3 of FIG. 2.

FIG. 4 is an enlarged detailed view taken along line 4—4 of FIG. 3.

FIG. 5 is an enlarged detailed view taken along line 5—5 of FIG. 3.

DESCRIPTION OF THE PREFERRED EMBODIMENT

Referring now to the drawings, the numeral 10 generally designates a chemical container adapted to be mounted upon a spray wagon 12. Wagon 12 comprises a wagon frame 14, a wagon tongue 16, and wagon wheels 18. A water tank 20 is mounted on wagon frame 14. Also extending upwardly from wagon frame 14 are a pair of chemical container supports 22, each having a support platform 24 at the upper end thereof.

Bolted to support platforms 24 are a pair of rectangular bases 26 which have bolts 28 extending therethrough for securing bases 26 to the support platforms 24. Rectangular base 26 includes an L-shaped, lock down tab 30 at one end and a toggle latch 32 at the opposite end.

Each container 10 comprises a top wall 34, a bottom wall 36, an end wall 38, a second end wall 40, and side walls 42. A cylindrical central wall 41 extends between side walls 42 and provides a cylindrical bore 43 extending through container 10.

Top wall 34 includes a fill opening 44 having a threaded neck 46 extending there around. A cap 48 is threaded over threaded neck 46. A U-shaped handle 49 extends upwardly from top wall 34. Also extending through top wall 34 is a tube opening 50 having an outlet tube 52 extending therethrough. Tube 52 is sealed within tube opening 50 by means of a sealing nut 54, an elastomeric seal 58, and a sealing flange 56 (FIG. 4).

The lower end 60 of tube 52 extends downwardly within the container 10 to a low point 62 of the bottom wall 36. Extending upwardly from low point 62 of bottom wall 36 is an inclined wall portion 64. This permits the liquid within the container 10 to drain downwardly to the lowest point 62 where it is picked up by the lower end 60 of suction tube 52 and removed. This permits efficient and substantially complete removal of the chemical from the container.

The outer walls of container 10 are deformed at several places into bolt recesses 66. Embedded within each bolt recess 66 is a bolt receptacle 68 which is preferably made of metal and which includes a threaded opening therein. The construction shown in the drawings illustrates that the interior wall of container 10 is continuous around the recesses 66 so that bolts can be threaded within receptacles 68 without protruding through or breaking the continuity of the walls of the container. This insures that chemicals will not leak around the places where the bolt receptacles are located.

A heel bracket 70 includes an upstanding leg 72, a heel portion 74, and an inclined portion 76. The upstanding leg 72 is attached to the wall 40 of the container by means of a bolt 78 threadably extending within the bolt receptacle 68. Similarly, a bolt 78 extends through the inclined portion 76 of heel bracket 70 and threadably engages a bolt receptacle 68 embedded within the bottom wall 36 of container 10. The heel portion 74 of bracket 70 includes a locking slot 80 which is adapted to receive the L-shaped lock down tab 30 which forms a part of rectangular base 26.

Mounted to end wall 38 of container 10, adjacent the lower end thereof, is a forward locking tab 82 which is held in place by a bolt 84 protruding within a receptacle 68 embedded within the front wall 38. As can be seen in FIG. 3, the toggle latch 32 is adapted to engage the forward locking tab 82 to detachably hold the container to rectangular base 26. The toggle latch 32 and the L-shaped lock down tab 30 rigidly hold the container in place, but they permit quick removal of the container from base 26 merely by unfastening toggle latch 32 and sliding the container upwardly and forwardly away from rear locking tab 30.

Thus, it can be seen that the device accomplishes at least all of its stated objectives. The heel bracket 70 holds the container in the proper orientation so that liquid chemical flows to the low point 62 of the container. Also, the heel bracket 70 provides a slot 80 for receiving the locking tab 30 at the rear of the container. The interior wall is continuous and unbroken, even though it contains a bolt receptacle 68 embedded therein. This prevents the chemical from leaking through openings around bolt holes. The container can be quickly mounted on the spray wagon 12 for use, and can be quickly removed and replaced with other similar containers when it is empty.

I claim:

1. A chemical tank comprising:
    bracket means;
    a plastic container having a plurality of walls including a top wall, side walls, and a bottom wall forming an enclosed chemical compartment therein;
    securing means for securing said bracket means to said container;
    said bracket means having a heel portion for engaging a horizontal support surface whereby said container will be supported on said support surface in a predetermined orientation;
    said bottom wall being inclined with respect to said support surface and having an upper portion and a lower portion when said bracket means holds said container in said predetermined orientation, said lower portion forming a settling point for liquid chemicals contained within said compartment;
    said top wall having a fill opening and a suction tube opening therein;
    a fill cap retentively removably attached over said fill opening;
    a suction tube having an upper end and a lower end, said suction tube extending through said suction tube opening with said upper end being located outside said container and said lower end located closely adjacent said settling point;
    sealing means sealing said suction tube to said top wall of said container so as to prevent leakage of fluid between said tube and said suction tube opening.

2. A chemical tank according to claim 1 wherein said side walls are substantially vertical when said bracket means holds said container in said predetermined orientation.

3. A chemical tank according to claim 2 wherein said container comprises four side walls, said top wall and said bottom walls being approximately rectangular in shape.

4. A chemical tank according to claim 1 wherein said side walls include at least two opposite side walls, said container having a cylindrical wall extending between said opposite side walls to provide structural support to said opposite side walls.

5. A chemical tank according to claim 1 wherein said securing means comprises at least one metal receptacle operatively attached to said container and having a threaded opening therein and a bolt means threadably extending into said threaded opening.

6. A chemical tank according to claim 5 wherein said walls of said container are deformed to at least partially surround said metal receptacles for securing said receptacles to said container whereby the interior surfaces of said walls remain continuous and unbroken adjacent said receptacles.

7. A chemical tank according to claim 1 wherein said top wall includes a portion thereof formed into a handle.

8. A chemical tank according to claim 1 comprising detachable securing means for detachably securing said container and said bracket means to said support platform.

9. A chemical tank according to claim 8 wherein said detachable securing means comprises a slot in said bracket means and a tab fixed to said platform and protruding within said slot.

10. A chemical tank according to claim 9 wherein said securing means further comprises a second tab fixed to said container and a releasable lock attached to said platform and releasably engaging said second tab.

* * * * *